No. 789,858.

Patented May 16, 1905.

UNITED STATES PATENT OFFICE.

JOHN A. JUST, OF PULASKI, NEW YORK.

EVAPORATED MILK AND METHOD OF MAKING SAME.

SPECIFICATION forming part of Letters Patent No. 789,858, dated May 16, 1905.

Application filed September 5, 1903. Serial No. 172,081.

*To all whom it may concern:*

Be it known that I, JOHN A. JUST, a citizen of the United States, residing at Pulaski, in the county of Oswego and State of New York, have invented new and useful Improvements in Evaporated Milk and Methods of Making Same, of which the following is a specification.

The object of this invention is to produce from cow's milk a milk powder or dry-milk product which is practically sterile or germ-free and which when mixed with a proper amount of water produces a milk-like liquid of good taste and flavor which is a good substitute for human milk, containing the milk solids in approximately the proportion and condition in which they are contained in human milk and which is therefore an article of food which is especially suitable for the nourishment of infants, patients, convalescents, and persons of weak digestion.

Human milk differs considerably in its percentage of proteid or casein and milk-sugar from cow's milk, and the chemical composition of the casein or proteid of human milk differs considerably from that of cow's milk.

The aim of this invention is to modify cow's milk in such manner as to produce therefrom a dry-milk product in which the casein or proteid of the cow's milk is modified in its chemical characteristics or composition to resemble the casein or proteid of human milk and in which the percentage of casein and milk-sugar is modified so as to resemble that of human milk.

In order to modify cow's milk so that its milk solids closely approximate those of human milk in percentage composition and in the chemical character of the casein, it is necessary to properly increase the percentage of its proteid, fat, and milk-sugar and to effect the partial digestion of its proteid. This will appear from the following illustration. If one hundred parts, by weight, of average cow's milk are diluted by the addition of one hundred and fifty parts of water, the diluted milk will have approximately the following percentage composition: casein, 1.20; albumen, 0.12; fat, 1.04; milk-sugar, 1.80; ash, 0.28; water, 95.56; total, one hundred. By adding albumen 0.38, fat 2.76, and milk-sugar 4.20 parts a mixture is obtained which has approximately the following percentage composition: casein, 1.20; albumen, 0.50; fat, 3.80; milk-sugar, 6.00; ash, 0.28; water, 88.22; total, one hundred. This approaches closely the percentage composition of human milk. If the proteid of this modified milk is partially digested, such proteid closely resembles the proteid of human milk. In order to reduce such modified cow's milk successfully to a dry state in such manner that the product is thoroughly sterilized or germ-free and that the solids are not injuriously affected or impaired in taste or flavor, it is necessary to evaporate the modified milk quickly in a thin film at a high temperature ranging from 212° to 270° Fahrenheit, as described in Letters Patent No. 712,545, granted to me November 4, 1902. The evaporation at a high temperature of this modified milk is, however, rendered difficult by the digestive treatment which weakens the proteid-sacks of the fat globules, so that upon drying the modified milk these weakened proteid-sacks are liable to burst and liberate the fat, causing the coalescence of the fat particles into masses or accretions, whereby a more or less greasy material is produced. Furthermore, the heated butter-fat produces, in connection with the excessive quantity of milk-sugar, a more or less pasty material, which assumes a yellowish or brownish color, owing, probably, to the partial oxidation and caramelization of the milk-sugar, and which has an unpleasant taste. To overcome these difficulties, it is advisable to add the fat, whether in the form of cream or otherwise, after the partial digestion of the proteid has been effected and to add the milk-sugar after the modified milk has been evaporated.

In practicing my invention according to the best method known to me I proceed as follows: Cow's milk containing about twelve per cent. of solids is partially digested by heating it to 100° to 110° Fahrenheit, adding pepsin, pancreatin, or some other hydrolytic agent, allowing the milk to remain at this temperature from ten to twenty minutes, according to the desired degree of conversion, and then stopping the digestive action by quickly raising the temperature to about 185° Fahrenheit or quickly lowering it to about 40° Fahrenheit. The desired conversion corresponds with the first steps of proteolysis. The additional fat is now added to the partially-digested milk, preferably in the form of cream, and is thoroughly commingled therewith. To cow's milk containing about twelve per cent. of solids of which about twenty-nine one-hundredths parts are butter-fat I add a quantity of cream containing an amount of fat about equal to four one-hundredths parts of the solids, so as to raise the fat contents to about thirty-three one-hundredths parts of the solids. This emulsion or mixture is then dried quickly in a thin film at a high temperature, which may range from 212° to 270° Fahrenheit, as fully described in my said Letters Patent. The dry product obtained from one-hundred pounds of milk and the added fat will amount to about 12.75 pounds, containing about 4.2 pounds of fat. By adding to and thoroughly commingling with this dry product about four pounds of pulverized milk-sugar 16.75 pounds of dry product are obtained. This final powder resembles in its percentage composition and in the character of its proteid or casein closely the solids of human milk. By the addition of a suitable quantity of water, preferably sterilized, to this product a milk-like liquid is produced which closely resembles human milk in percentage composition in the physical and chemical character of its constituents and in nutritive value and which has a fine taste and flavor. For illustration, by mixing with one part, by weight, of this dry product seven parts of water the resulting compound will be about as follows: casein, 2.27; albumen, 0.23; fat, 3.03; milk-sugar, 6.44; ash, 0.50; water, 87.53; total, one hundred.

Water can be added to the dry-milk product in greater or less proportion as conditions of use may require. The percentage of fat and milk-sugar may be varied within certain limits in preparing the dry product as the uses for which the product is designed may render desirable.

The herein-described dry-milk product contains the milk solids substantially unaltered chemically and physically and unimpared as to taste and flavor. It is throughly sterilized or germ-free, so that all danger of communicating disease is avoided and its keeping qualities are greatly increased. It is easily digestible, and therefore a desirable food for infants, patients, convalescents, and persons whose digestion is weak, and it can be readily mixed with farinaceous or other substances in compounding various food products.

If it should be desired to increase the nitrogenous value of the product, this can be readily done by adding casein or some other suitable albuminous substance in the desired proportion to the milk before the partial digestion of the latter. For some purposes skim-milk can be substituted for full-milk.

I claim as my invention—

1. The method of producing a modified dry-milk product which consists in partially digesting the milk and quickly evaporating the partially-digested milk in the form of a film at a temperature of not less than 212° Fahrenheit.

2. The method of producing a modified dry-milk product which consists in heating the milk to a temperature of about 100° to 110° Fahrenheit, adding a hydrolytic agent, allowing the milk to remain at this temperature until the desired partial digestion has been effected, then stopping the digestive action, and quickly evaporating the partially-digested milk in the form of a film at a temperature of not less than 212° Fahrenheit.

3. The method of producing a modified dry-milk product which consists in partially digesting the milk by treatment with pepsin and quickly evaporating the partially-digested milk in the form of a film at a temperature of not less than 212° Fahrenheit.

4. The method of producing a modified dry-milk product which consists in partially digesting the milk, adding a suitable quantity of fat thereto, and evaporating the mixture.

5. The method of producing a modified dry-milk product which consists in partially digesting the milk, adding a suitable quantity of fat thereto, and quickly evaporating the mixture in the form of a film at a high temperature.

6. The method of producing a modified dry-milk product which consists in partially digesting the milk, adding a suitable quantity of fat thereto, quickly evaporating the mixture in the form of a film at a high temperature, and adding milk-sugar to the evaporated mixture.

7. In the method of producing a modified dry-milk product the herein-described steps which consist in adding fat to the milk and quickly evaporating the mixture in the form of a film at a high temperature.

8. In the method of producing a modified dry-milk product the herein-described steps which consist in partially digesting the milk, quickly evaporating the mixture in the form of a film at a high temperature, and adding milk-sugar to the evaporated mixture.

9. The method of producing a modified dry-milk product which consists in adding casein to the milk, partially digesting the mixture, adding a suitable quantity of fat, and evaporating the mixture.

10. The method of producing a modified dry-milk product which consists in adding casein to the milk, partially digesting the mixture, adding a suitable quantity of fat, and quickly evaporating the mixture in the form of a film at a high temperature.

11. The herein-described dry-milk product containing the milk solids of partially-digested milk in a sterilized and soluble condition and fat in excess of the proportion contained in cow's milk.

12. The herein-described dry-milk product containing the milk solids of partially-digested milk in a sterilized and soluble condition and fat and milk-sugar in excess of the proportion contained in cow's milk.

13. The herein-described dry-milk product containing the milk solids of partially-digested milk in a sterilized and soluble condition and casein in excess of the proportion contained in cow's milk.

14. The herein-described dry-milk product containing the milk solids of partially-digested milk in a sterilized and soluble condition and containing about thirty-three per cent. of fat.

15. The herein-described dry-milk product containing the milk solids of partially-digested milk in a sterilized and soluble condition and containing about thirty-three per cent. of fat and fifty-five per cent. of milk-sugar.

Witness my hand this 1st day of September, 1903.

JOHN A. JUST.

Witnesses:
ANN L. FARRELL,
JAMES J. FARRELL.